US000001920H

United States Statutory Invention Registration [19]

[11] Reg. Number: H1,920

Xu et al.

[45] Published: Nov. 7, 2000

[54] SYSTEM AND METHOD FOR PROCESSING WIRELESS VOICE AND DATA/FAX TELECOMMUNICATIONS DATA

[75] Inventors: Dexiang John Xu, Cordova; Shawn W. Vines, Bartlett; Howard L. Andersen, Collierville, all of Tenn.

[73] Assignee: DSC/Celcore, Inc., Plano, Tex.

[21] Appl. No.: 09/161,075

[22] Filed: Sep. 25, 1998

Related U.S. Application Data

[60] Provisional application No. 60/071,152, Jan. 12, 1998.

[51] Int. Cl.[7] ..... H04Q 7/20

[52] U.S. Cl. ..... 455/403

*Primary Examiner*—Daniel T. Pihulic
*Attorney, Agent, or Firm*—Baker & McKenzie

[57] ABSTRACT

A method for processing telecommunications data is provided. The method includes receiving telecommunications data, such as at a component of a telecommunications switch. It is then determined whether the telecommunications data includes speech/voice data or data/fax data. Transcoder and rate adaption processing is performed on the telecommunications data with signal processing circuitry if the telecommunications data is speech/voice data. Otherwise, interworking function processing is performed on the telecommunications data with the signal processing circuitry if the telecommunications data is data/fax data.

23 Claims, 6 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 1
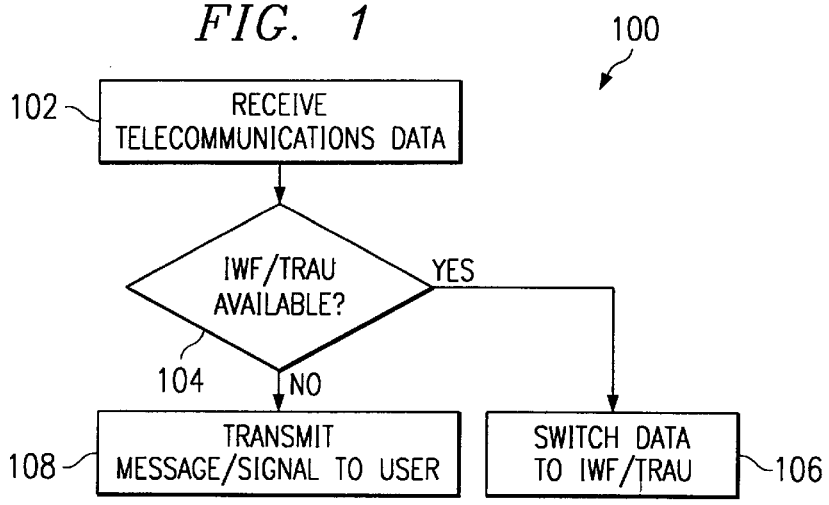
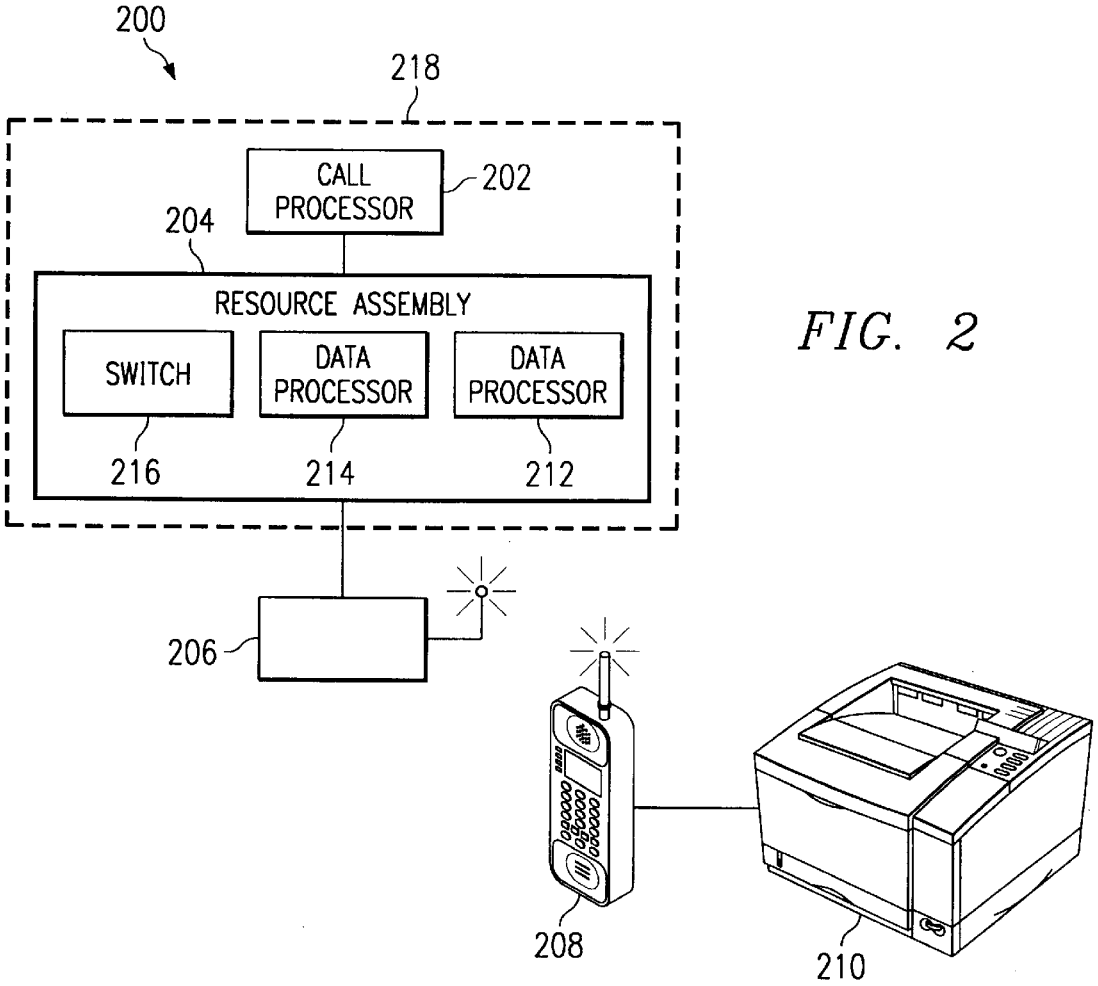
FIG. 2

SYSTEM AND METHOD FOR PROCESSING WIRELESS VOICE AND DATA/FAX TELECOMMUNICATIONS DATA

CLAIM OF PRIORITY

The instant patent application claims priority from the U.S. provisional patent application designated with Ser. No. 60/071,152, entitled "Communication System with Distributed Interworking Function," naming Dexiang J. Xu as inventor, and which was filed on Jan. 12, 1998.

RELATED PATENT APPLICATIONS

This patent application is related to the following patent applications: (a) the U.S. patent application Ser. No. 09/026,320 designated by DSC Case No. 827-00 and Attorney Docket No. 24194000.173, entitled "Flexible Telecommunications System Architecture," naming Anthony G. Fletcher and Scott D. Hoffpauir as inventors, filed Feb. 19, 1998; (b) the U.S. patent application Ser. No. 09/026,190 designated by DSC Case No. 835-00 and Attorney Docket No. 24194000.181, entitled "Resource Management Sub-System of a Telecommunications Switching System," naming Howard L. Andersen and Scott D. Hoffpauir as inventors, and which was filed concurrently with the instant patent application; (c) the U.S. patent application Ser. No. 09/026,810 designated by DSC Case No. 836-00 and Attorney Docket No. 24194000.182, entitled "Generic Wireless Telecommunications System," naming Anthony G. Fletcher and Scott D. Hoffpauir as inventors, and which was filed concurrently with the instant patent application; (d) the U.S. patent application Ser. No. 09/026,505 designated by DSC Case No. 830-00 and Attorney Docket No. 24194000.176, entitled "Agent Interworking Protocol and Call Processing Architecture for a Communications System," naming Scott D. Hoffpauir, Steve B. Liao and Kelvin K. Kinsey as inventors, and which was filed concurrently with the instant patent application; and (e) U.S. patent application No. 08/678,254, now U.S. Pat. No. 5,835,486, entitled "Multi-Channel Transcoder Rate Adapter Having Low Delay and Integral Echo Cancellation," naming James M. Davis and James D. Pruett as inventors, and which was filed Jul. 11, 1996.

FIELD OF THE INVENTION

The present invention relates to a telecommunications system, and more particularly, a telecommunications system that provides for the processing of wireless speech/voice data and data/fax telecommunications data.

BACKGROUND

Conventional wireless telecommunications systems are composed of several distinct pieces of interconnected equipment, each carrying out various functions. For instance, a conventional wireless telecommunications system, designed pursuant to the current Global System for Mobile Communications (abbreviated GSM) standard, may include (1) a transcoder and rate adaption system for processing voice/speech data, and (2) an interworking function system for processing data/fax data (the interworking function system also performs rate adaption). The systems are typically comprised of separate components, such that telecommunications channels carrying voice/speech data that are processed by the transcoder and rate adaption system must be switched to a different component or system than telecommunications channels carrying data/fax data.

The separation of systems or components within a wireless telecommunications system results in numerous disadvantages. One disadvantage is that switching and transmission delays may be incurred in order to process the telecommunications data because the transcoder and rate adaption system and the interworking function system may be physically located in different locations. Another disadvantage that results from having separate systems or components is that additional equipment is required in order to provide the same level of functionality for all possible service conditions. For example, if all telecommunications channels that are being processed at a given instant may be either voice/speech data or data/fax data, then the transcoder and rate adaption system and the interworking function system must each be sized to handle this maximum capacity, even the total loading of the combined systems at any given instant can never exceed 50 percent.

Many significant disadvantages are thus encountered by conventional wireless telecommunications systems. What is therefore needed is a wireless telecommunications system that allows voice/speech telecommunications data and data/fax telecommunications data to be processed with additional processing and switching delays and without the need for idle capacity in equipment.

SUMMARY OF THE INVENTION

The present invention sets out to, among other things, overcome the aforementioned problems associated with conventional wireless telecommunications systems by integrating the functionality of distinct components within a common system.

One object of the present invention is to provide a telecommunications system that provides for the performance of transcoder and rate adaption processing using the same systems or components as interworking function processing.

Another object of the present invention is to allow switching of telecommunications channels to systems and components of a telecommunications switch that may perform the transcoder and rate adaption processing and the interworking function processing.

In accordance with the present invention, a method for processing telecommunications data is provided. The method includes receiving telecommunications data, such as at a component of a telecommunications switch. It is then determined whether the telecommunications data includes speech/voice data or data/fax data. Transcoder and rate adaption processing is performed on the telecommunications data with signal processing circuitry if the telecommunications data is speech/voice data. Otherwise, interworking function processing is performed on the telecommunications data with the signal processing circuitry if the telecommunications data is data/fax data.

Another aspect of the present invention is a system for processing telecommunications data. The system includes a first data processing system that processes wireless speech/voice data and wireless data/fax data, and a second data processing system that processes wireless speech/voice data. A switch coupled to the first data processing system and the second data processing system transfers telecommunications data to the first data processing system if the telecommunications data comprises wireless data/fax data, and transfers telecommunications data to the second data processing system if the telecommunications data comprises speech/voice data.

The present invention provides many important technical advantages. One important technical advantage of the present invention is that it is not necessary to route telecommunications data external to the switch for performing the transcoder and rate adaption processing and the interworking function processing. Another important technical advantage of the present invention is that it is not necessary to provide redundant systems and components that can perform only one type of data processing, such as performing the transcoder and rate adaption processing and the interworking function processing.

Other and further objects, aspects, features and advantages of the present invention will be apparent from the following detailed description of an exemplary embodiment of the invention, given for the purpose of disclosure and taken in conjunction with the accompanying drawings.

BRIEF DESCRIPTION OF THE DRAWINGS

The present invention may be better understood from the following detailed description of an exemplary embodiment of the present invention with reference to the accompanying drawings, in which:

FIG. 1 is a flow chart of a method for processing telecommunications data that may be either speech/voice data or data/fax data, in accordance with teachings of the present invention;

FIG. 2 is a diagram of a system for processing telecommunications data that may be either speech/voice data or data/fax data, in accordance with an exemplary embodiment of the present invention;

DETAILED DESCRIPTION OF THE DRAWINGS

Figure 3:
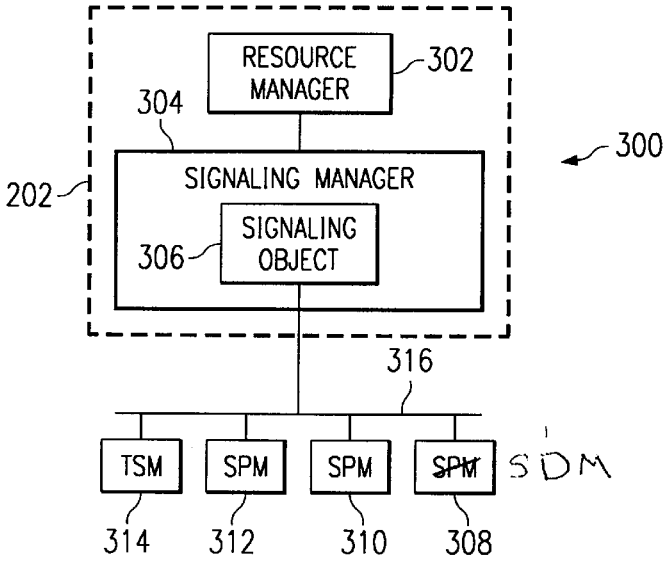
FIG. 3 is a diagram of a system and components for processing telecommunications data that may be either speech/voice data or data/fax data, in accordance with an exemplary embodiment of the present invention.

FIG. 1 is a flow chart of a method 100 for processing speech/voice telecommunications data and data/fax telecommunications data in a wireless telecommunications system, in accordance with teachings of the present invention. Method 100 may be used in conjunction with systems or components that are operable to perform the transcoder and rate adaption processing and the interworking function processing on telecommunications data.

Method 100 begins at step 102, where telecommunications data is received at a telecommunications switch. For example, the telecommunications data may include frames of data in a Global System for Mobile Communications data format or other suitable standard or proprietary data formats, encoded voice/speech data, encoded data/fax data, or other suitable forms of telecommunications data. The telecommunications data may be received at a call processing system, an interface system, a switch system, or other suitable systems of a telecommunications switch, such as those shown in the U.S. patent application Ser. No. 09/026,320 designated by DSC Case No. 827-00 and Attorney Docket No. 24194000.173, entitled "Flexible Telecommunications System Architecture," naming Anthony G. Fletcher and Scott D. Hoffpauir as inventors, filed Feb. 19, 1998. The method then proceeds to step 104.

At step 104, it is determined whether the telecommunications data is speech/voice data requiring transcoder and rate adaption processing, or data/fax data requiring interworking function processing. For example, it may be determined whether the telecommunications data is speech/voice data or data/fax data by comparing the value of a data field of a data frame with predetermined values, such as the C1 through C5 bits of a Global System for Mobile Communications data frame. Also or alternatively, other data may be used to determine whether the telecommunications data is speech/voice data or data/fax data, such as signaling data or payload data.

If it is determined at step 104 that the telecommunications data is speech/voice data, the telecommunications data is transferred to a transcoder and rate adaption system for processing. For example, the transcoder and rate adaption system may be a system or component(s) that is configured to perform either transcoder and rate adaption processing or interworking function processing on the telecommunications data. Also or alternatively, the transcoder and rate adaption system may be a system or component(s) that is configured to perform only transcoder and rate adaption processing on the telecommunications data.

If it is determined at step 104 that the telecommunications data is data/fax data, the telecommunications data is transferred to an interworking function system for processing. For example, the interworking function system may be a system or component(s) that is configured to perform either transcoder and rate adaption processing or interworking function processing on the telecommunications data. Also or alternatively, the interworking function system may be a system or component(s) that is configured to perform only transcoder and rate adaption processing on the telecommunications data.

In operation, method 100 is used with system(s) or component(s) that are configured to perform both the transcoder and rate adaption processing and the interworking function processing on telecommunications data. For example, method 100 may be used with system(s) or component(s) that are each configured for dual mode, such that they can perform transcoder and rate adaption processing and interworking function processing on telecommunications data channels. Method 100 may also be used with system(s) or component(s) in which some component(s) or system(s) are configured for dual mode and can perform both processes on telecommunications data channels, while other systems and components can perform either the transcoder and rate adaption processes or the interworking function processes. In those configurations, the dual mode components are used to eliminate unnecessary redundancy of equipment.

For example, method 100 may be used in a system in which voice/speech data channels account for thirty percent to eighty percent of all telecommunications channels, with the balance being data/fax data. Using method 100, thirty percent of the systems and components may be configured for processing voice/speech data, twenty percent may be configured for processing data/fax data, and fifty percent may be configured for dual mode use. In this configuration there is no need to have idle components, such that all components may operate continuously at full loading, as adjusted for load factors.

Likewise, method 100 may be used in a system which has a data/fax usage ration ranging from zero to ten percent, such that ten percent of the components are configured for dual mode operation. In this manner, the dual mode systems or components can process speech/voice data if there is no data/fax telecommunications data present, and can process the data/fax data when it is present. The present invention thus eliminates the need to switch such data/fax telecommunications data to an external processor.

FIG. 2 is a diagram of a system 200 for processing speech/voice telecommunications data and data/fax telecommunications data in a wireless telecommunications system, in accordance with teachings of the present invention. System 200 includes call processor 202, resource assembly 204, transmitter/receiver 206, wireless terminal device 208, and data/fax device 210. Switch 218, formed by call processor 202, resource assembly 204, and transmitter/receiver 206, is operable to transmit and receive speech/voice data to and from wireless terminal device 208 or data/fax data from data/fax device 210 using system(s) and component(s) that are operable to perform transcoder and rate adaption processing or interworking function processing on telecommunications data.

Call processor 202 is a general call processing application that performs call processing functions on telecommunications data. Call processor 202 receives signaling data and payload data for telecommunications channels and determines the appropriate call setup routines and methods for each telecommunications channel. For example, call processor 202 may receive signaling data and determine that the telecommunications channel to be established will carry data/fax telecommunications. Call processor 202 then routes the telecommunications channel through system(s) or component(s) that are operable to perform interworking function processing on the telecommunications data. Call processor 202 may also determine the type of telecommunications data by retrieving predetermined bits of data from a standard or proprietary data frame, such as the C1 through C5 bits of a Global System for Mobile Communications data frame.

If switch 218 uses dual mode system(s) and component(s) for the processing of telecommunications data, call processor 202 determines the availability of such dual mode components and routes the telecommunications channels accordingly. For example, if the single mode components are only able to perform transcoder and rate adaption processing on the telecommunications data and the telecommunications data requires interworking function processing, call processor 202 determines if a dual mode system or component is available. If a dual mode system or component is available, call processor 202 sets the mode to interworking function processing and routes the telecommunications data to the available dual mode component or system. If a dual mode system or component is not available, call processor 202 causes a message to be transmitted to the caller notifying the caller of unavailability of interworking function processing resources.

Resource assembly 204 comprises systems and components that perform telecommunications data processing functions, such as interface functions, switching functions, signal processing functions, and telephony support functions. Resource assembly 204 may be a general purpose telecommunications support platform, or may be comprised of individual discrete telecommunications components. Resource assembly further comprises telecommunications data processors 212 and 214 and switch 216.

Telecommunications data processors 212 and 214 may be, for example, digital signal processors, application-specific integrated circuits, general purpose data processing equipment, field programmable gate arrays, or other suitable data processing components or systems. Each telecommunications data processor 212 and 214 may be operable to perform the transcoder and rate adaption processing and the interworking function processing, such that any telecommunications channel carrying either speech/voice data or data/fax data may be routed to any telecommunications data processor 212 or 214 by switch 216. Alternatively, telecommunications data processor 212 may have dual mode functionality, whereas telecommunications data processor 214 may be operable to only perform transcoder and rate adaption processing, such that telecommunications channels containing data/fax data must be routed to telecommunications data processor 212 by switch 216. In the event that telecommunications data processor 212 is unavailable, then a busy message may be generated and transmitted to the calling party indicating the unavailability of resources.

In operation, wireless terminal device 208 is used to transmit telecommunications data to switch 218 through transmitter/receiver 206. The telecommunications data may include speech/voice data or data/fax data. If the telecommunications data is speech/voice data, call processor 202 determines which of telecommunications data processors 212 or 214 can perform transcoder and rate adaption processing, and routes the telecommunications data channel to that telecommunications data processor through switch 216. If the telecommunications data processor 212 or 214 is a dual mode processor, then call processor 202 sets the mode to transcoder and rate adaption mode. Alternatively, the telecommunications data processor may be operable to independently set this mode.

Likewise, if the telecommunications data is data/fax data, call processor 202 determines which of telecommunications data processors 212 or 214 can perform interworking function processing and routes the telecommunications data channel to that telecommunications data processor. If all telecommunications data processors are dual mode processors, then call processor 202 sets the mode to data/fax. As noted previously, the telecommunications data processors may also be operable to independently set this mode.

FIG. 3 is a diagram of a switch 300 that is operable to processing speech/voice telecommunications data and data/fax telecommunications data in a wireless telecommunications system, in accordance with teachings of the present invention. Switch 300 includes call processor 202, switch module 308, signal processing modules 310 and 312, telephony support module 314, and telecommunications data bus 316.

Call processor 202 is a call processing application that operates on a general purpose computing platform, such as a Pentium general purpose computer. Call processor 202 may be implemented in hardware, software, or a suitable combination of hardware and software and includes resource manager 302, signaling resource manager 304, and signaling object 306, each of which may be implemented in hardware, software, or a suitable combination of hardware and software.

Resource manager 302 maintains a database containing data that defines the operational state of telecommunications data processing resources, such as switch module 308, signal processing modules 310 and 312, telephony support module 314, and telecommunications data bus 316. Resource manager 302 may also perform additional functions, such as transferring computer software to telecommunications resources at system start-up, performing diagnostic tests, maintaining data memory addresses, and other suitable functions.

Signaling resource manager 304 manages the telecommunications signaling processes that are required to set up and tear down telecommunications channels through switch 300. For example, signaling resource manager 304 may receive incoming signaling from wireless terminal devices or the public switched telephone network, and may analyze the data to determine the signaling resources required to set up the call. These signaling resources include tone generation resources of telephony support module 314, interface resources, and other suitable signaling resources. Signaling object 306 resides on signaling resource manager 306, and transfers to between components of switch 300 as needed to accomplish signaling-related tasks.

In operation, signaling data is received at signaling resource manager 304, which determines the type of telecommunications data channel that is being set up. If the telecommunications data channel will carry speech/voice data, signaling object 306 is used to determine from resource manager 302 which signal processing module 310 or 312 can perform transcoder and rate adaption processing on the telecommunications data. If the signal processing module 310 or 312 is dual mode, then signaling resource manager may transfer suitable mode selection commands to the signal processing module 310 or 312 using signaling agent 306. A telecommunications channel is also established through switching module 308 and data bus 316 to the signal processing module 310 or 312.

If the telecommunications data channel will carry data/fax data, signaling resource manager 304 performs similar functions to those performed to set-up a telecommunications data channel that will carry speech/voice data. If the signaling or switch resources that are required to set-up and support a data/fax data channel are not available, a telecommunications data channel to telephony support module 314 is established via switch module 308 and data bus 316. Telephony support module 314 generates tones or messages to notify the caller that resources are not presently available, so that the caller may attempt to establish the telecommunications channel at a later time.

Figure 4:
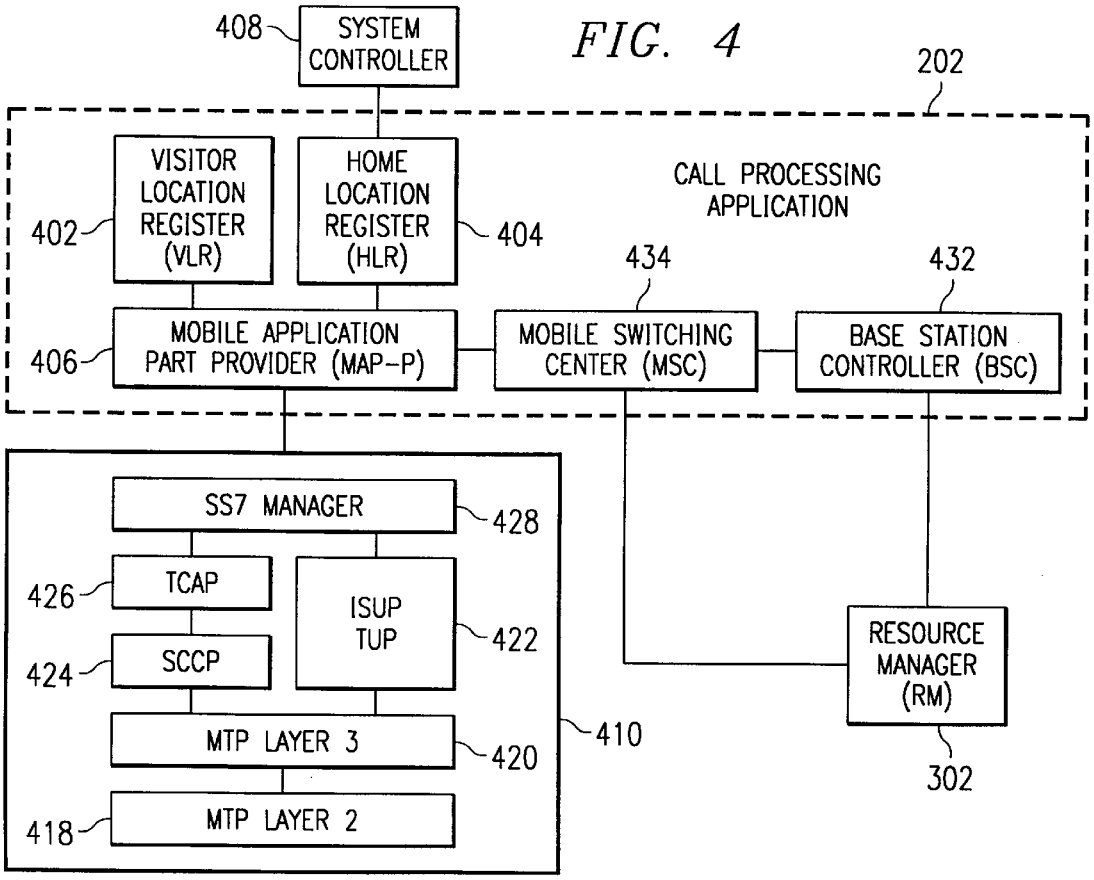
FIG. 4 is a diagram of a call processing system for processing telecommunications data in accordance with an exemplary embodiment of the present invention.

FIG. 4 illustrates various elements included within the call processor 202, which may be used in conjunction with systems and components that are compatible with the GSM standard and in accordance with an exemplary embodiment of the present invention.

Call processor 202 includes base station controller 432, mobile switching center 434, visitor location register 402, home location register 404, and mobile application part provider 406, each of which may be implemented in hardware, software, or a suitable combination of hardware and software. Home location register 404 and visitor location register 402 provide a database function for subscriber-related information, including the service options to be provided to each subscriber (for example, voice mail, call waiting, call forwarding, etc.), preferences and option selections supplied by the subscribers (for example, call forwarding numbers or criteria), and the location of those subscribers. Home location register 404 provides database functions for those subscribers enrolled for service with the operator of call processor 202. In contrast, visitor location register 402 provides database functions for roaming subscribers that are presently in the area serviced call processor 202. A roaming subscribers is a subscriber associated with another service provider or telecommunications system for which subscriber-related information is maintained in a location that is external to home location register 404 of call processor 202. For example, visitor location register 402 of call processor 202 may receive subscriber data from the home location register of another operator or telecommunications system, and may likewise provide the external home location register with data regarding the location of the roaming subscriber.

It should be appreciated that although conventional systems typically integrate functions associated with the mobile switching center 434 and the visitor location register 402, it is preferable to form distinct elements for those functions.

SS7-type signaling is provided to call processor 202 as a transport mechanism for mobile application part dialogues and out-of-band signaling with other switches. That signaling includes several parts, each having a distinct protocol. Specifically, SS7 signals include: (a) a lower layer Message Transfer Part, which applies to call-related or non-call related signaling; (b) a Signaling Connection Control Part and a Transaction Capabilities Application Part, which apply to non-call related signaling and (c) Telephone User Part and Integrated Services Digital Network User Part, which apply to call-related signaling. SS7 element 410 includes elements that correspond with the aforementioned parts, namely, message transfer part layer 2 element 418, message transfer part layer 3 element 420, and Integrated Services Digital Network User Part/Telephone User Part element 422, signaling connection control part element 424 and transaction capabilities application part element 426. Through these elements, the SS7 element 410 provides functionality related to each of those elements 418 through 428, including global title translations and terrestrial and satellite links.

SS7 manager 428 provides for management and cooperation with respect to the other elements of SS7 element 410 and elements of call processor 202, such as resource manager 302, mobile application part provider 406, and mobile switching center 434.

Mobile application part provider 406 is the logical link between visitor location register 402 and home location register 404, and provides the dialogues through which they communicate with each other and with other elements. Mobile application part provider 406 provides a protocol based on the services provided by the SS7 element 410 for non-call related signaling (such as Transaction Capabilities Application Part) for use by other elements. The specific nature of the protocol provided by mobile application part provider 406 is dependent on the identity of such elements, which is sometimes referred to as the MAP protocol interface. For example, messages between visitor location register 402 and an external home location register utilize one MAP protocol interface while messages between the home location register 504 and an external visitor location register utilize another MAP protocol interface. Preferably, authentication functions are integrated within home location register 404 to provide authentication information for validating subscribers requesting service.

Figure 5:
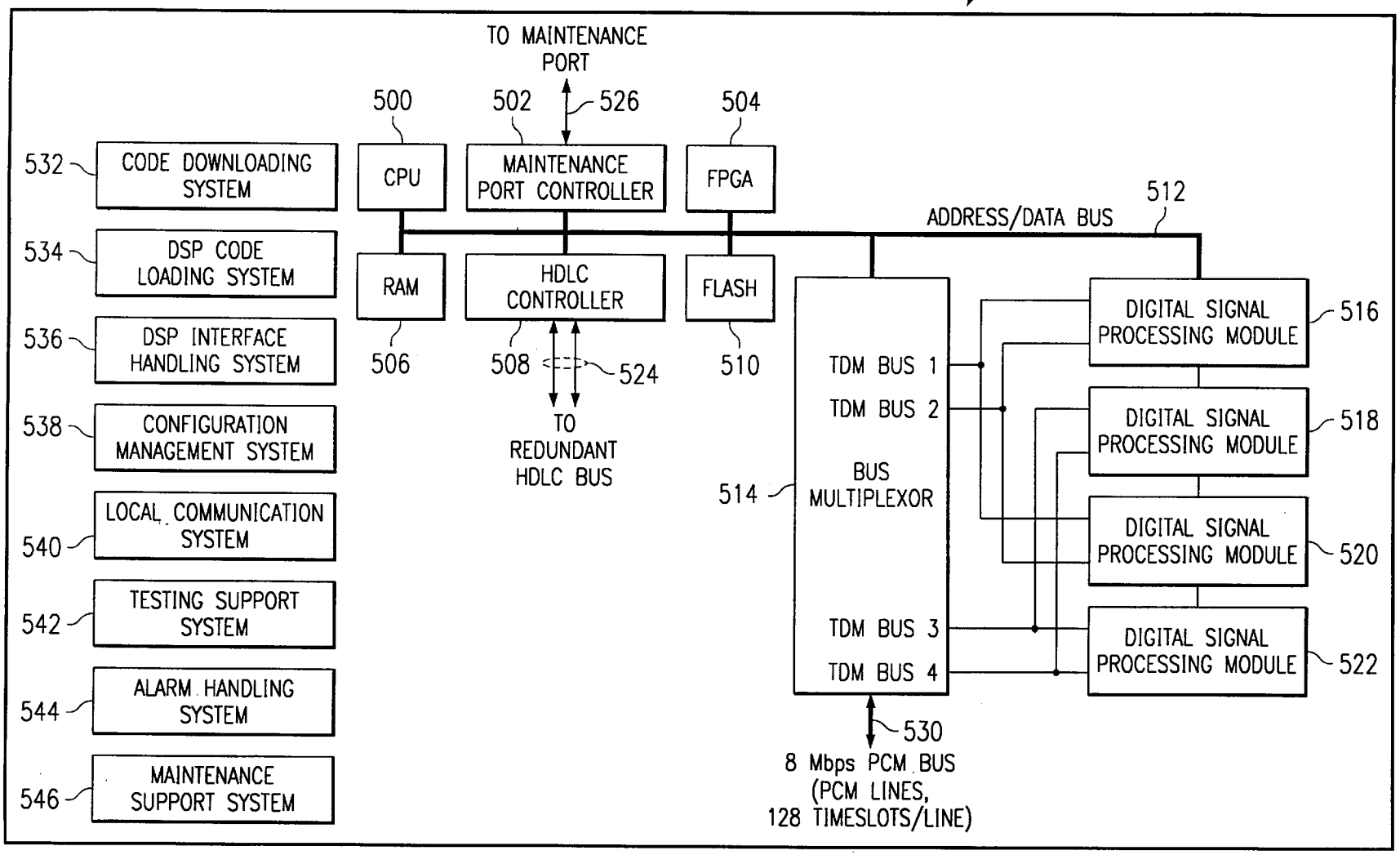
FIG. 5 is a diagram of a signal processing module for processing telecommunications data in accordance with an exemplary embodiment of the present invention.

FIG. 5 is a block diagram of a signal processing module 310 or 312 in accordance with teachings of the present invention. Signal processing module 310 or 312 is used to provide real-time transcoding and rate adaption functions, interworking functions, and other suitable functions for a telecommunications system.

Signal processing module 310 or 312 includes processor 500. Processor 500 may include, for example, a Motorola 68360 or an Intel 80186 processor. Processor 500 controls the functions of signal processing module 310 or 312. Processor 500 has internal serial communications controllers that provide an Ethernet interface as well as an interface to the RS 232 maintenance port over a maintenance port interface 526. Processor 500 is coupled to address/data bus 512.

Signal processing module 310 or 312 also includes random access memory 506. Random access memory 506 provides memory storage location for code execution, data storage, and a system information and status register. The system information and status register stores data pertaining to the system configuration and operational status of the system components for telecommunications switch 218. Random access memory 506 is also coupled to address/data bus 512.

Signal processing module 310 or 312 also includes flash memory module 510. Flash memory module 510 is used to store software systems that control the operations of signal processing module 310 or 312. Flash memory module 510 stores a non-volatile copy of boot code (used for initiating operation of signal processing module 310 or 312), operational code, and field programmable gate array data. Operational code includes both TRAU and IWF software modules. During power up, both software modules may be downloaded to internal DSP memory from flash. The boot block of flash memory module 510 is protected against inadvertent erasure by dual inline packet switches, such that when the dual inline packet switches are in the normal position, protected flash blocks cannot be written or erased. Field programmable gate array 504 provides logic to interconnect other functional blocks of signal processing module 310 or 312. For example, field programmable gate array 504 may be programmed to provide control logic for address/data bus 512. Field programmable gate array 504 is coupled to address/data bus 512.

High Level Data Link Controller module 508 is a two port serial communications controller that provides communications over two redundant High Level Data Link Controller buses 524. High Level Data Link Controller module 508 supports the local communications function, which is a point to multi-point High Level Data Link Controller bus link between the switching module 308 and the resource modules. The High Level Data Link Controller buses 524 provide part of the communications path between the call processor 202 and the resource modules. Switching module 308 completes the path to call processor 202 via an Ethernet interface.

Address/data bus 512 includes two or more serial conductors that are coupled to processor 500, random access memory 506, flash memory module 510, field programmable gate array 504, High Level Data Link Controller module 508, bus multiplexor 514, and digital signal processing modules 516, 518, 520, and 522. The address/data buses 512 are used to transfer data between the components of signal processing module 310 or 312, and may be controlled by programmed instructions of field programmable gate array 504. Pulse code modulation bus 530 is an 8 megabit per second pulse code modulation data bus. Pulse code modulation bus 530 may include 16 serial pulse code modulation buses that each have 128 time slots per serial bus.

Bus multiplexor 514 is used to control the transfer of pulse code modulated telecommunications data from pulse code modulation bus 530 to digital signal processing modules 516, 518, 520, and 522. Bus multiplexor 514 preferably switches the 8 megabit per second 128 time slot time division multiplex data from pulse code modulation bus 530 so as to transfer a two megabit per second 32 time slot time division multiplex bus to each digital signal processing module 516 through 522. Two of the two megabit per second buses may be used for data that is encoded in accordance with the Global System for Mobil Communications standard, and two may be used for pulse code modulation data. Two of the two megabit per second time division multiplex data buses are available to each digital signal processing module 516 through 520. Each digital signal processing module 516 through 520 preferably comprises two digital signal processing integrated circuits, although any suitable number of signal processing modules and digital signal processing integrated circuits may be used.

The software systems of signal processing modules 310 or 312 include a code downloading system 532, a digital signal processor code loading system 534, a digital signal processor interface handling system 536, a configuration management system 538, a local communication system 540, a testing support system 542, an alarm handling system 544, a maintenance support system 546, and other suitable systems. These systems may be implemented in software, hardware, or a suitable combination of software and hardware. For example, the software systems of signal processing modules 310 or 312 may be programmed in C computer code, C++ computer code, or other suitable computer programming codes. The function of each system is described in greater detail below.

The code downloading system 532 of signal processing module 310 or 312 downloads code to flash memory module 510 for use by the software systems of signal processing module 310 or 312, respectively. Download messages are received from call processor 202 which indicate the availability of boot block files, operational software files, or field programmable gate array data files. These files reside on a data storage device of call processor 202. After receiving a download command, signal processing module 310 or 312 will download the code files or data files and store them in flash memory module 510. A confirmation message for the download is transmitted to call processor 202 by switching module 308.

The digital signal processor code loading system 534 downloads operational code onto digital signal processor systems located on digital signal processing modules 516, 518, 520, and 522, and initializes the operational code to ensure that the code will operate correctly. The digital signal processor code loading system 534 may download code individually or simultaneously on the digital signal processor systems. This code may cause the digital signal processors to implement one or more software systems, such as software systems that perform transcoder and rate adaption processing on encoded speech/voice data and interworking function processing on encoded data/fax data. Data memory component and data processing component sizes and capabilities may limit the ability of all digital signal processor s to be configured for performing all kinds of processing on a cost-effective basis. In such cases, it is suitable to combine dual or multiple mode functionality onto one or several digital signal processors, and to route the lesser occurring telecommunications data type (such as data/fax data) to those digital signal processors for processing, such that the dual or multiple mode digital signal processors may be used as needed for either data type on an as-needed basis.

The digital signal processor interface handling system 536 configures the channels of digital signal processors on signal processing modules 516, 518, 520, and 522. Each digital signal processor can process a predetermined number of channels of telecommunications data, depending on the bandwidth of the channel and the level of processing being performed. For example, for a 16 kilohertz bandwidth Global System for Mobile Communications format data channel that is being converted to a pulse code modulation format at 64 kilohertz with transcoding and rate adaption processing, four channels of telecommunications data may be processed by each digital signal processing system. Other data rates and processing functions, such as interworking function processing, may result in other numbers of channels that may be handled by each digital signal processing system.

The configuration management system 538 of signal processing module 310 or 312 performs resource module assembly configuration management functions. All configuration-related aspects of the resource module assembly are controlled by the configuration management system 538, including but not limited to identification and tracking of active resource modules, control of resource module identifiers and addresses, maintenance of resource module configuration data, management of hardware failovers, installation and removal of components during operation, and other functions. The initial interface description data is received by the configuration management system 538 from call processor 202, and is used to generate the necessary commands and tables for the connections needed by signal processing modules 310 or 312, switching module 308, and telephony support module 314.

The local communications system 540 of signal processing modules 310 or 312 is used to establish point to multi-point connectivity between the switching module 308 and processors located on individual resource modules. Communications are performed over the High Level Data Link Controller bus 524. The local communications system 540 of signal processing modules 310 or 312 identifies processors of resource modules that are active and periodically polls unused resource module slots to determine if a module has been installed into the system.

The testing support module 542 generates a response to test commands and is also configured to make various connections required for built in tests and fault isolation tests. The alarm handling system 544 monitors the signal processing module 310 or 312 for alarm and error conditions and transmits an alarm or error message to the switching module 308 when an alarm or error condition is present. The maintenance support system 546 manages the diagnostic input and output to and from the signal processing module 310 or 312 via an RS232 port.

In operation, signal processing modules 310 and 312 are used to convert between pulse code modulated telecommunications data and data that is encoded in accordance with the Global System for Mobile Communications. The signal processing modules may all be configured to handle speech/voice data and data/fax data, or may alternatively be configured so that less than all are configured to handle speech/voice data and data/fax data, with the rest being configured to handle only a single type of data. If this alternative embodiment is implemented, additional functionality is required to determine whether a channel of telecommunications data is carrying data/fax data or speech/voice data, and to route the telecommunications to a suitable digital signal processing module of a given signal processing module.

Figure 6:
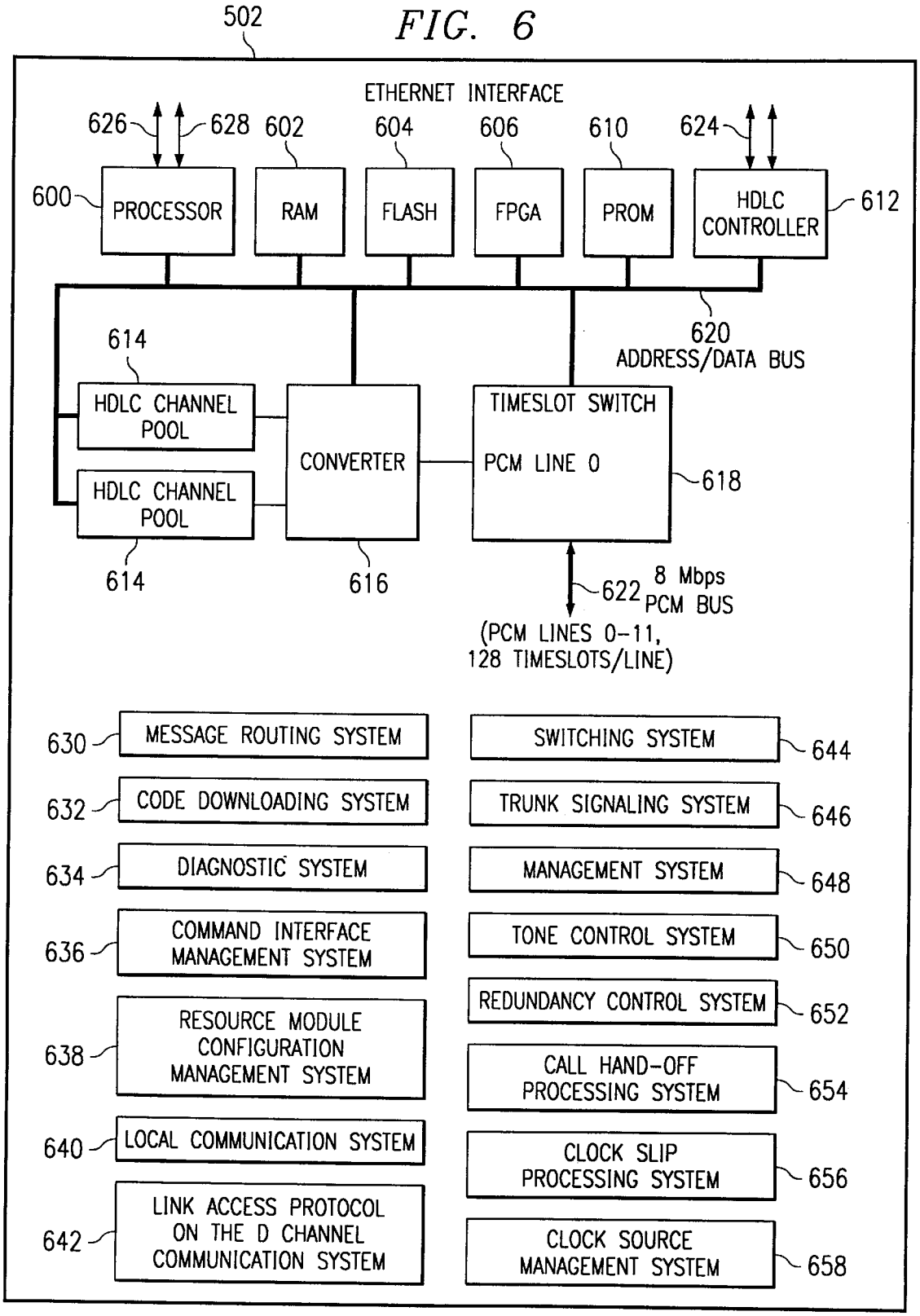
FIG. 6 is a block diagram of a switching module in accordance with one embodiment of the present invention.

FIG. 6 is a block diagram of a switching module 308 in accordance with one embodiment of the present invention. Switching module 308 is used to provide switching, clock functions, local communications, link access protocol on the D channel communications, and Ethernet connectivity for a telecommunications system.

Switching module 308 includes processor 600. Processor 600 may include, for example, a Motorola 68360 processor. Processor 600 controls the functions of switching module 308. Processor 600 has internal serial communications controllers that provide an Ethernet interface as well as an interface to the RS 232 maintenance port over a maintenance port interface 626. Processor 600 is coupled to address/data bus 620.

Switching module 308 also includes random access memory 602. Random access memory 602 provides memory storage location for code execution, data storage, and a system information and status register. The system information and status register stores data pertaining to the system configuration and operational status of the system components for telecommunications switch 300. Random access memory 602 is also coupled to address/data bus 620.

Switching module 308 also includes flash memory module 604. Flash memory module 604 is used to store software systems that control the operations of switching module 308. Flash memory module 604 stores a non-volatile copy of boot code (used for initiating operation of switching module 308), operational code, and field programmable gate array data. The boot block of flash memory module 604 is protected against inadvertent erasure by dual inline packet switches, such that when the dual inline packet switches are in the normal position, protected flash blocks cannot be written or erased. Field programmable gate array 606 provides logic to interconnect other functional blocks of switching module 308. For example, field programmable gate array 606 may be programmed to provide control logic for address/data bus 620. Field programmable gate array 606 is coupled to address/data bus 620.

Programmable read-only memory module 610 contains predetermined data such as the unique Ethernet media access control address, the serial number, the hardware run date, the revision number, and other suitable data for the switching module 308. Programmable read-only memory module 610 is coupled to address/data bus 620.

High Level Data Link Controller module 612 is a two port serial communications controller that provides communications over two redundant High Level Data Link Controller buses 624. High Level Data Link Controller module 612 supports the local communications function, which is a point to multi-point High Level Data Link Controller bus link between the switching module 308 and the resource modules. The High Level Data Link Controller buses 624 provide part of the communications path between the call processor 202 and the resource modules. Switching module 308 completes the path to call processor 202 via an Ethernet interface 628.

Each High Level Data Link Controller channel pool 614 provides a total of 64 kilobits per second of High Level Data Link Controller data channels. High Level Data Link Controller channel pools 614 are coupled to converter 616, which is operable to convert four- two megahertz data channel inputs into one eight megahertz data channel output. Converter 616 may be a Siemens MUSAC converter or other suitable converters. Converter 616 provides High Level Data Link Controller data channels of 64 kilobits per second each to accommodate Link Access Protocol on the D Channel communications with the base transceiver stations 16 over an Abis interface. Converter 616 is coupled to High Level Data Link Controller channel pools 614, address/data bus 620, and time slot switch 618. Each High Level Data Link Controller channel pool 614 is a multichannel network interface controller, such as a Siemens MUNICH 32 PEB 20320, or other suitable multichannel network interface controller.

Time slot switch 618 is a time slot interchange random access memory matrix that is used to make all required time slot cross connections within the system. These connections include voice/speech traffic channels and data/fax channels, initial system definition connections upon power and reset, and connections needed for the testing of time slots when they are not in use. Data for switching is provided to the time slot switch 618 via the address/data bus 620.

Address/data bus 620 includes two or more serial conductors that are coupled to processor 600, random access memory 602, flash memory module 604, field programmable gate array 606, programmable read-only memory module 610, High Level Data Link Controller module 612, High Level Data Link Controller channel pools 614, converter 616 and time slot switch 618. The address/data buses 620 are used to transfer data between the components of switching module 308, and may be controlled by programmed instructions of field programmable gate array 606. Pulse code modulation bus 622 is an 8 megabit per second pulse code modulation data bus. Pulse code modulation bus 622 may include 16 serial pulse code modulation buses that each have 128 time slots per serial bus.

The software systems of switching module 308 include a message routing system 630, a code downloading system 632, a diagnostic system 634, a command interface management system 636, a resource module configuration management system 638, a local communication system 640, a link access protocol on the D channel communication system 642, a switching system 644, a trunk signaling system 646, a management system 648, a tone control system 650, a redundancy control system 652, a call hand-off processing system 654, a clock slip processing system 654, and a clock source management system 656. These systems may be implemented in software, hardware, or a suitable combination of software and hardware. For example, the software systems of switching module 308 may be programmed in C computer code, C++ computer code, or other suitable computer programming codes. The function of each system is described in greater detail below.

The message routing system 630 of switching module 308 provides a single point of communication between the resource module assembly and call processor 202. Messages received from call processor 202 are routed to the proper destination within the resource module assembly by the message routing system 630. These messages may be routed over the High Level Data Link Controller buses 624. The message routing system 630 also routes messages over a remote link access protocol on the D channel link to the base transceiver station(s). Messages from the resource module assembly are routed to the resource manager by the switching module 308.

The code downloading system 632 of switching module 308 downloads code to flash memory module 604 for use by the software systems of switching module 308. Download messages are received from call processor 202 which indicate the availability of boot block files, operational software files, or field programmable gate array data files. These files reside on a data storage device of call processor 202. After receiving a download command, switching module 308 will download the code files or data files and store them in flash memory module 604. A confirmation message for the download is transmitted to call processor 202 by switching module 308.

Switching module 308 also includes a diagnostic system 634. Built-in diagnostic tests ("BITs") are periodically executed by the diagnostic system 634 of switching module 308. The diagnostic system 634 of switching module 308 attempts to establish connections using available and untested time slots, such that all time slots are eventually tested. The diagnostic system 634 also supports performance of fault isolation tests ("FITs") that are used to further isolate a problem.

Switching module 308 also includes a command interface management system 636. The command interface management system 636 is used to support diagnostic and troubleshooting efforts by receiving user-entered commands and generating user-readable displays.

The configuration management system 638 of switching module 308 performs resource module assembly 510 configuration management functions. All configuration-related aspects of the resource module assembly 510 are controlled by the configuration management system 638, including but not limited to identification and tracking of active resource modules, control of resource module identifiers and addresses, maintenance of resource module configuration data, management of hardware failovers, installation and removal of components during operation, and other functions. The initial interface description data is received by the configuration management system 638 from call processor 202, and is used to generate the necessary commands and tables for the connections needed by signal processing module 508, interface module 504, and telephony support module 506.

The local communications system 640 of switching module 308 is used to establish point to multi-point connectivity between the switching module 308 and processors located on individual resource modules. Communications are performed over the High Level Data Link Controller bus 624. The local communications system 640 of switching module 308 identifies processors of resource modules that are active and periodically polls unused resource module slots to determine if a module has been installed into the system.

The link access protocol on the D channel communication system 642 of switching module 308 manages call setup data, such as signaling, frequency allocation, and other suitable call setup data. The switching system 642 of switching module 308 makes all required connections for the telecommunications system. These include connections for actual telephone calls (such as duplex connections or conference calls), connections upon power up or reset, connections for trunk signaling, connections for built-in diagnostic tests and fault isolation tests, and connections for tone and announcement playback.

The trunk signaling system 644 of switching module 308 manages the trunk signaling functionality of each resource module. Trunk signaling resources reside on the telephony support module 506 and the interface module 504, such that the trunk signaling system 644 communicates with interface module 504 and telephony support module 506 to provide trunk signaling. In addition, the trunk signaling system 644 maintains the configuration as well as the free/busy status of each signaling resource.

The management system 646 of switching module 308 periodically services hardware to prevent system resets. The management system 646 periodically polls the system information and status register to detect a change in the bus ownership status of the switching module 308, such as a change from online to standby. The tone control system 648 of switching module 308 performs tone generation and control functions for the telecommunication system. The tone control system 648 performs playback of tones (periodic, timed and continuous) for trunk signaling and other call related functions as well as the playback of digitized announcements. The tone control system 648 causes switching module 308 to switch circuits to a predetermined time slot when a particular tone or digital announcement is needed. Each predetermined time slot is associated with a particular tone or digital announcement.

The redundancy control system 650 of switching module 308 provides support for recovering from fail over from an online switching module 308 to a standby switching module without dropping established calls. The redundancy control system 650 transfers data from the hardware and software systems of switching module 308 to the redundancy control system 650 operating on any backup switching modules 308. This data includes but is not limited to time slot switch status, call status, link access protocol status, and resource module configuration data. When a new switching module 308 is installed into the telecommunications system during operation, the redundancy control system 650 synchronizes the new switching module 308 with the telecommunications system. In addition, the redundancy control system 650 maintains periodic communications between the online switching module 308 and any standby switching modules 308 to allow the removal of a standby switching module 308 to be detected, and the addition of any new standby switching module 308 to be detected.

The hand-off processing system 652 of the switching module 308 receives hand-off data from the call processor 202 and performs hand-off functions. For example, when the call processor 202 determines that a hand-off is necessary, such as in response to control data received from the base transceiver stations, the hand-off processing system 652 receives the current source channel data, the new destination channel data, and performs routing of hand-off data between the source channel and destination channel digital signal processors in order to optimize the echo cancellation process.

The clock slip processing system 654 of the switching module 308 monitors the slip rate of each E-1 telecommunications channel coupled to interface modules 504. When the slip rate exceeds a predetermined alarm threshold, the clock slip processing system 654 generates an alarm and determines the direction of the slip (positive or negative). The clock slip processing system 654 also identifies the location and address of the signal processing modules 508 and associated digital signal processors for the E1 telecommunications channel, and sends telecommunications channel slip correction messages to the appropriate digital signal processors.

The clock source management system 656 of switching module 308 selects the source from which the system clock will be derived. An internal clock on the switching module 308 as well as clocks extracted from telecommunications channels connected to the interface module 504 may be selected. The clock source management system 656 also manages clock source priority by receiving operator-entered data that specifies the order in which other clocks are to be selected in the event that a telecommunications channel that is providing the system clock fails.

In operation, the redundancy control system 650 of switching module 308 obtains data from the other software and hardware systems of switching module 308 and transfers the data to the redundant switching module 308 via Ethernet interface 628 or other suitable data links. This data includes time slot switch data, telecommunications channel data, signaling data, and resource module configuration data. Data is transferred for established telecommunications channels, which occurs after the call processor 202 transmits a message that indicates that the telecommunications channel is established.

Figure 7:
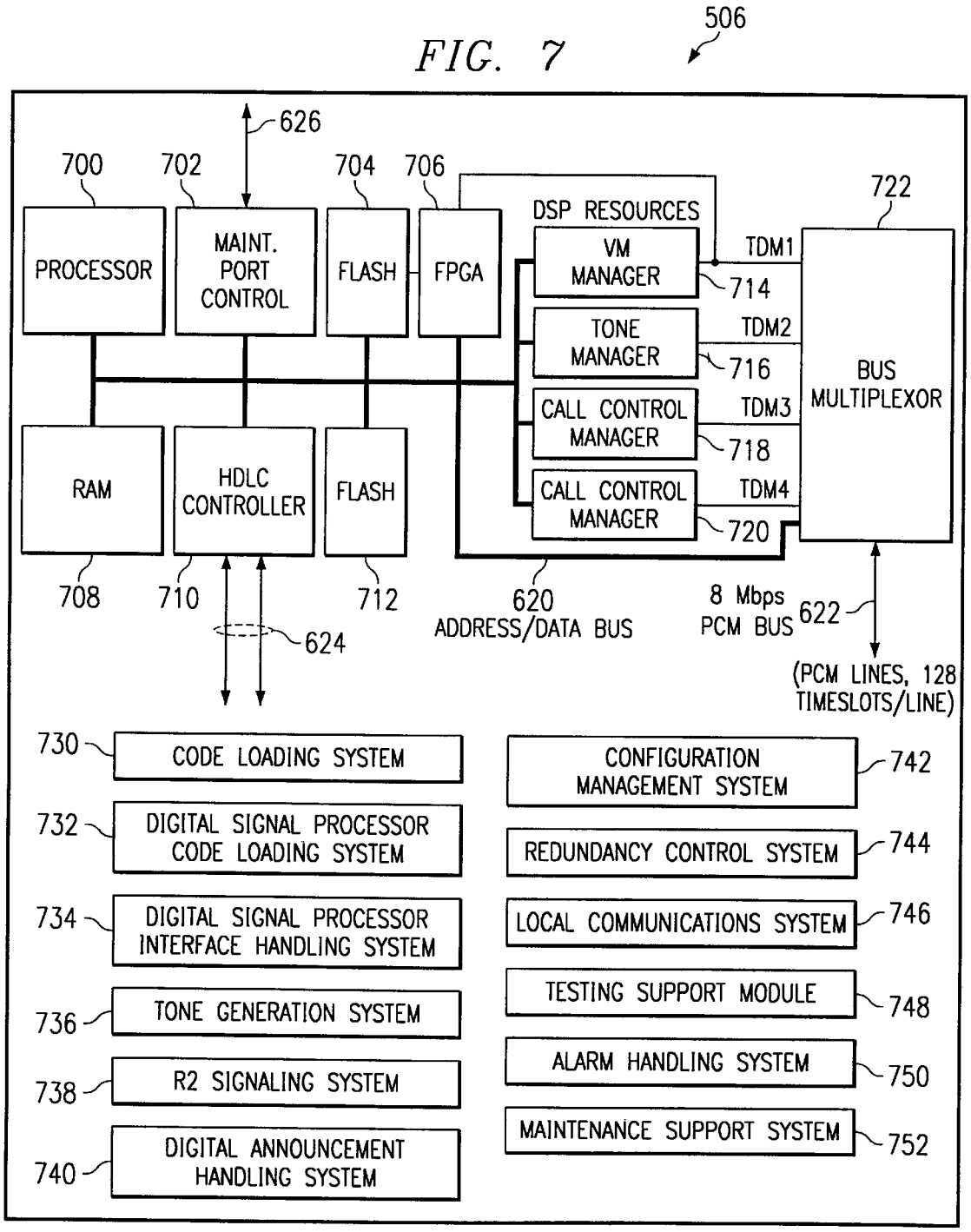
FIG. 7 is a block diagram of a telephony support module in accordance with one embodiment of the present invention.

FIG. 7 is a block diagram of a telephony support module 506 in accordance with one embodiment of the present invention. Telephony support module 506 is used to provide tone generation, R2 transceiver functionality, and digitized announcement functionality for a telecommunications system. Telephony support module 506 supports standard tone sets.

Telephony support module 506 includes a processor 700. Processor 700 may be a suitable processor including but not limited to an Intel 80186 processor. Processor 700 controls the activities and functions of telephony support module 506. Telephony support module 506 also includes a maintenance port control module 702. Maintenance port control module 702 provides an RS-232 communications interface for diagnostic and troubleshooting purposes. Maintenance port control module 702 is coupled to maintenance port interface 626.

Telephony support module 506 also includes flash memory module 704. Flash memory module 704 is used to store digitized announcements. Flash memory module 704 is operable to receive control commands to initiate playback of the digitized announcements. Field programmable gate array ("FPGA") module 706 of telephony support module 506 controls flash memory module 704 playback. For example, field programmable gate array module 706 may receive control commands for playback of a digitized announcement. Field programmable gate array module 706 then generates additional control commands that cause flash memory module 704 to play back the digitized announcement.

Random access memory module 708 of telephony support module 506 provides memory storage space for code execution and data storage. Random access memory module 708 is used by the components of telephony support module 506. Telephony support module 506 also includes High Level Data Link Controller module 710. High Level Data Link Controller module 710 is a two-port serial communications controller that provides communications over two redundant High Level Data Link Controller buses 624. High Level Data Link Controller module 710 supports point-to-point local communications between the telephony support module 506 and the switching module 308.

Flash memory module 712 of telephony support module 506 stores a non-volatile copy of boot code, operational code, field programmable gate array data, digital signal processor code, and tone tables. The boot block of flash memory module 712 is hardware protected from inadvertent erasure. Voice message manager module 714 is a digital signal processor resource which is implemented in or more suitable digital signal processors. Voice message manager module 714 manages the recording and playback of digital announcements. Voice message manager module 714 provides both 8-second and 16-second messages.

Tone manager module 716 is a digital signal processor resource. Tone manager module 716 manages the generation and decoding of tones, including but not limited to dual tone multiple frequency (DTMF) tones, using a table downloaded from processor 700. This table contains such data as the time slot data, tone generation class, frequencies, levels, and other suitable data for each of the tones to be generated.

Call control manager modules 718 and 720 are digital signal processor resources. The call control manager modules manage the trunk signaling for the purposes of receiving the transmitted call routing data, such as digits. Signaling state engines are executed on the telephony support module 506 for the purpose of transmitting or receiving data over a public switch telecommunications network interface that is configured for channel-associated signaling. Multiplexer module 722 switches the time slot time division multiplex buses, operating at 8 megabits per second, from the pulse code modulation bus to the 2 megabit per second time division multiplex buses used by the digital signal processor resources and flash memory module 704.

Telephony support module 506 also includes software systems that operate on the hardware components of telephony support module 506 described above, which perform operations required for the operation of the telephony support module 506. These software systems include a code loading system 730, a digital signal processor code loading system 732, a digital signal processor interface handling system 734, a tone generation system 736, an R2 signaling system 738, a digital announcement handling system 740, a configuration management system 742, a redundancy control system 744, a local communications system 746, a testing support module 748, an alarm handling system 750, and a maintenance support system 752. Each of these systems is described in greater detail below.

The code loading system 730 of telephony support module 506 performs downloads via the switching module 308 of all software components, such as boot code, from a memory device of the call processor system 49. The digital signal processor code loading system 732 loads digital signal processor code onto the digital signal processors and initializes the digital signal processors. When all the code has been written to the digital signal processors, the digital signal processors will execute the code from internal memory.

The digital signal processor interface handling system 734 interfaces the processor 700 to the digital signal processors to initially configure all digital signal processor channels. The tone generation system 736 initializes the tone generation table so that the digital signal processor can generate the required tones. The R2 signaling system 738 performs the R2 signaling function for the purpose of receiving and transmitting call routing data over a public switched telecommunications network interface. The digital announcement handling system 740 manages the recording and playback of digital announcements. The configuration management system 742 manages the configuration of the individual digital processor channels.

The redundancy control system 744 detects changes in the telephony support module 506 bus ownership status, such as from online to standby, and transmits a message to the switching module 308 when a change in status occurs. The redundancy control system 744 of telephony support module 506 also provides support for recovering from fail-over from an online telephony support module 506 to a standby telephony support module 506 without dropping established calls. The redundancy control system 744 transfers data from the hardware and software systems of telephony support module 506 to the redundancy control system operating on any backup telephony support modules 506. This data includes but is not limited to tone data, configuration data for the digital signal processor channels, and system configuration data. When a new telephony support module 506 is installed into telecommunications switch 12 during operation, the redundancy control system 744 synchronizes the new telephony support module 506 with the telecommunications switch 12. In addition, the redundancy control system 744 maintains periodic communications between the online telephony support module 506 and any standby telephony support modules 506 to allow the removal of a standby telephony support module 506 to be detected, and the addition of any new standby telephony support module 506 to be detected.

The local communication system 746 manages communications with the switching module 308 over High Level Data Link Controller buses 624. The testing support module 748 generates a response to test commands and is also configured to make various connections required for built in tests and fault isolation tests. The alarm handling system 750 monitors the telephony support module 506 for alarm and error conditions and transmits an alarm or error message to the switching module 308 when an alarm or error condition is present. The maintenance support system 752 manages the diagnostic input and output to and from the telephony support module 506 via an RS232 port.

In operation, the redundancy control system 744 of telephony support module 506 obtains data from the other software and hardware systems of telephony support module 506 and transfers the data to the redundant telephony support module 506 via redundant High Level Data Link bus 624 or other suitable data links. This data includes tone data, digital signal processor channel configuration data, and other suitable telephony data.

Figure 8:
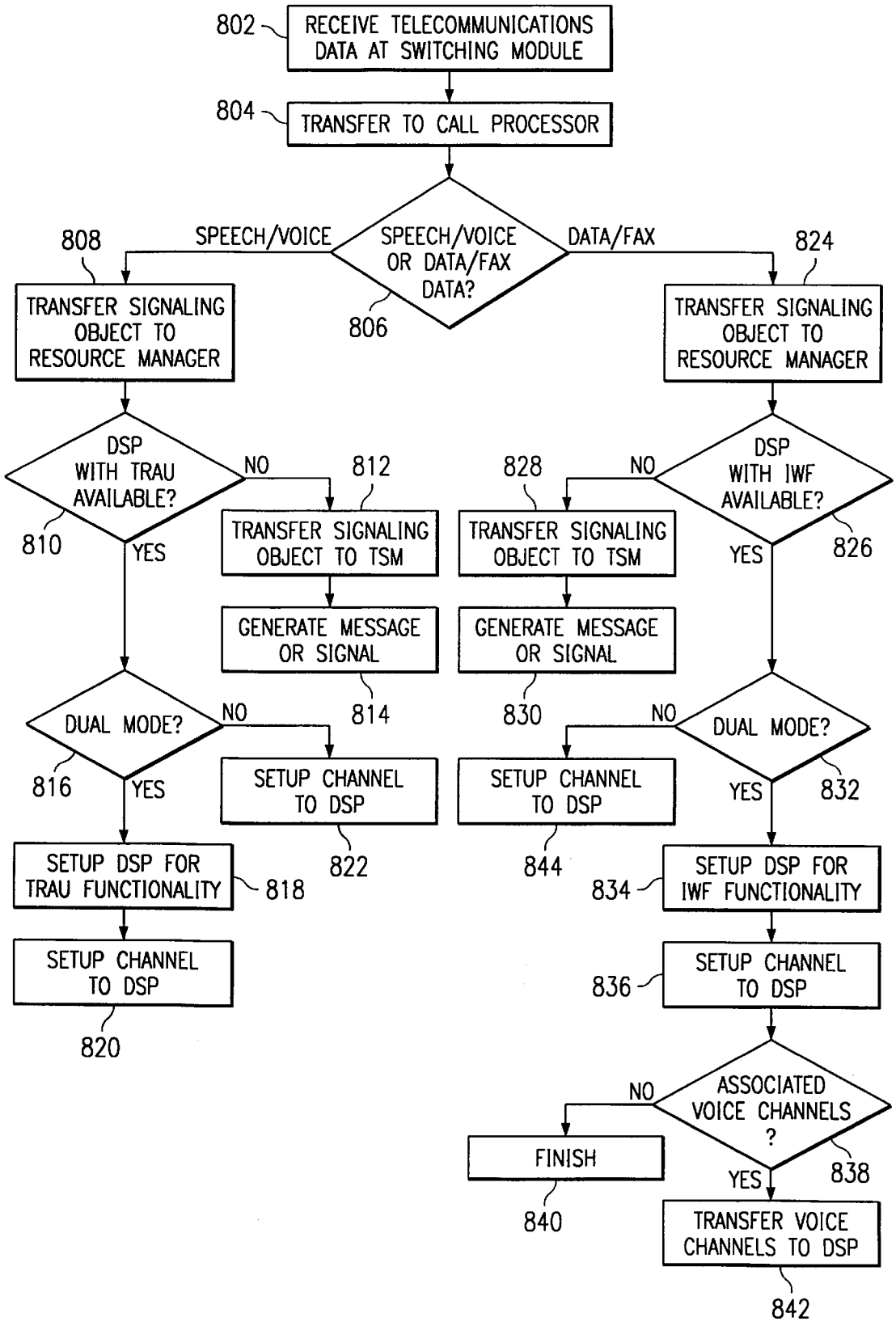
FIG. 8 is a flow chart of a method for processing telecommunications in accordance with the teachings of the present invention.

FIG. 8 is a flow chart of a method 800 for processing telecommunications data in accordance with teachings of the present invention. Method 800 may be used in a telecommunications switch system that includes dual mode speech/voice data and data/fax data processing components, or a mix of single mode and dual mode components, as noted in the description below.

Method 800 begins at step 802, where telecommunications data is received at a switching module, such as switching module 308. The telecommunications data is then transferred by the switching module to a call processor system at step 804. At step 806, the call processor determines whether the telecommunications data is speech/voice data or data/fax data, such as by checking the value of predetermined bits of data of a standard data frame format.

If it is determined at step 806 that the telecommunications data is speech/voice data, then the method proceeds to step 808 where a signaling object is transferred from the call processor system to a resource manager system. At step 810, it is determined whether a digital signal processing module or circuit with transcoder and rate adaption processing functionality is available. If such a digital signal processing module is not available, then the method proceeds to step 812, where the signaling object is transferred to a telephony support module with suitable status data to indicate that there are no digital signal processing module resources available for the telecommunications channel. The telephony support module then generates a suitable message or signal at step 814 to notify the caller that the telecommunications channel can not be established at the present time.

If it is determined at step 810 that a digital signal processing module or circuit with transcoder and rate adaption processing capability is available, then the method proceeds to step 816, where it is determined whether the digital signal processing module is dual mode. If the digital signal processing module is dual mode (or if all digital signal processing modules are dual mode), then the method proceeds to step 818 where the digital signal processing module is set up for transcoder and rate adaption processing, if necessary. For example, it may be necessary to download or activate code so as to implement a software system, it may be necessary to set a flag to a predetermined value in a data buffer, or other suitable measures may be implemented to set up the digital signal processing module. The method then proceeds to step 820, where the telecommunications channel is set up through the provisioned digital signal processor. If it is determined at step 816 that the digital signal processing module is not a dual mode module, then the method proceeds directly to set up the telecommunications channel through the provisioned digital signal processor at step 838.

If it is determined at step 806 that the data is data/fax data, the method proceeds to step 824 where a signaling object containing telecommunications data type data is transferred from the call processor system to a resource manager system. At step 826, it is determined whether a digital signal processing module or circuit with interworking function processing functionality is available. If such a digital signal processing module is not available, then the method proceeds to step 828, where the signaling object is transferred to a telephony support module with suitable status data to indicate that there are no digital signal processing module resources available for the telecommunications channel. The telephony support module then generates a suitable message or signal at step 830 to notify the caller that the telecommunications channel can not be established at the present time.

If it is determined at step 826 that a digital signal processing module or circuit with interworking function processing capability is available (or if all digital signal processing modules are dual mode), then the method proceeds to step 832, where it is determined whether the digital signal processing module is dual mode. If the digital signal processing module is dual mode, then the method proceeds to step 834 where the digital signal processing module is set up for interworking function processing, if necessary. For example, it may be necessary to download or activate code so as to implement a software system, it may be necessary to set a flag to a predetermined value in a data buffer, or other suitable measures may be implemented to set up the digital signal processing module. The method then proceeds to step 836, where the telecommunications channel is set up through the provisioned digital signal processor. For a system that processes data in a Global System for Mobile Communications data format, it is further determined at step 838 whether there are any voice channel frames accompanying the data channel frame. If not, the method ends at step 840. Otherwise, the voice channels are also transferred for processing by the digital signal processor with the data channel at step 842. If it is determined at step 832 that the digital signal processing module is not a dual mode module, then the method proceeds directly to set up the telecommunications channel through the provisioned digital signal processor at step 844.

In operation, method 800 is used to process telecommunications data that may comprise speech/voice data or data/fax data. It is first determined whether the telecommunications data is speech/voice data or data/fax data. If the telecommunications data is speech/voice data, then it is transferred to a digital signal processing module that is operable to perform transcoder and rate adaption processing on the data. If the telecommunications data is data/fax data, then it is transferred to a digital signal processing module that is operable to perform interworking function processing on the data. If dual mode digital signal processing modules are used, then the digital signal processing modules must be set to the proper mode. If a mix of dual mode and single mode digital signal processing modules are used, or if dual mode and single mode digital signal processing circuits are used on a single digital signal processing module, then the data must be switched or otherwise directed to an appropriate telecommunications channel that accesses a suitable digital signal processing module or circuit.

The present invention is well adapted to carry out the objects and attain the ends and advantages mentioned, as well as others inherent therein. While an exemplary embodiment of the invention have been given for the purposes of disclosure, alternative embodiments, changes and modifications in the details of construction, interconnection and arrangement of parts will readily suggest themselves to those skilled in the art after having the benefit of this disclosure. This invention is not necessarily limited to the specific embodiment and examples illustrated and described above. All embodiments, changes and modifications encompassed within the spirit of the invention are included, and the scope of the invention is defined by a proper construction of the following claims.

What is claimed is:

1. A system for processing telecommunications data comprising:

a first data processing system operable to process wireless speech/voice data and wireless data/fax data;

a second data processing system operable to process wireless speech/voice data; and a switch coupled to the first data processing system and the second data processing system, the switch operable to transfer telecommunications data to the first data processing system if the telecommunications data comprises wireless data/fax data and to transfer telecommunications data to the second data processing system if the telecommunications data comprises speech/voice data.

2. The system of claim 1 wherein the switch further comprises a data type detector operable to determine whether telecommunications data contains one of speech/voice data and data/fax data.

3. The system of claim 1 wherein the switch further comprises a data type detector operable to receive a frame of telecommunications data and to determine whether a predetermined data field of the frame contains data that is indicative of one of speech/voice data and data/fax data.

4. The system of claim 1 wherein the switch further comprises a call processor operable to determine whether telecommunications data contains one of speech/voice data and data/fax data.

5. The system of claim 1 further comprising a signaling agent operable to interface with the switch, the first data processing system, and the second data processing system, wherein the signaling agent can determine the availability status of the first data processing system and the second data processing system in response to a request for status from the switch, and can return the availability status of the first data processing system and the second data processing system to the switch.

6. The system of claim 1 wherein the switch further comprises:

a signaling system operable to receive telecommunications data and to extract signaling data from the telecommunications data that includes data indicative of whether the telecommunications data includes speech/voice data or data/fax data; and a resource manager coupled to the signaling system, the resource manager operable to store data indicative of the availability status of the first data processing system and the second data processing system, the resource manager further operable to respond to a request for availability status of the first data processing system and the second data processing system from the signaling system.

7. A system for processing telecommunications data comprising:

a call processor operable to determine whether the telecommunications data includes one of speech/voice data and data/fax data; and a resource assembly coupled to the call processor, wherein the resource assembly further comprises:

a first data processing system operable to process wireless speech/voice data and wireless data/fax data;

a second data processing system operable to process wireless speech/voice data; and a switch coupled to the first data processing system and the second data processing system.

8. The system of claim 7 wherein the call processor further comprises:

a signaling resource manager operable to process the telecommunications data to determine whether it is speech/voice data or data/fax data; and a resource manager couple to the signaling resource manager, the resource manager operable to maintain data on the operational status of one or more resource modules that are required to establish a telecommunications channel.

9. The system of claim 8 further comprising a signaling object that is operable to be transferred between the signaling resource manager, the resource manager, and one or more of the resource modules, where the signaling object is configured to transfer data between the signaling resource manager, the resource manager, and one or more of the resource modules in predetermined data fields.

10. The system of claim 7 wherein the first data processing system is implemented on a first circuit card, and the second data processing system is implemented on a second circuit card.

11. The system of claim 7 wherein the first data processing system is implemented on a first digital signal processor integrated circuit, and the second data processing system is implemented on a second digital signal processor integrated circuit.

12. A method for processing telecommunications data comprising:

receiving telecommunications data;

determining whether the telecommunications data includes speech/voice data or data/fax data;

performing transcoder and rate adaption processing on the telecommunications data with signal processing circuitry if the telecommunications data is speech/voice data; and performing interworking function processing on the telecommunications data with the signal processing circuitry if the telecommunications data is data/fax data.

13. The method of claim 12 wherein receiving telecommunications data comprises receiving telecommunications data at a switching module.

14. The method of claim 12 wherein receiving telecommunications data comprises receiving telecommunications data at a call processor.

15. The method of claim 12 wherein determining whether the telecommunications data includes speech/voice data or data/fax data comprises comparing the value of predetermined bits of a data format with a call processor to predetermined values of data that correspond to speech/voice data and data/fax data.

16. The method of claim 12 wherein determining whether the telecommunications data includes speech/voice data or data/fax data comprises comparing the value of predetermined bits of a data format with a switching module to predetermined values of data that correspond to speech/voice data and data/fax data.

17. The method of claim 12 wherein performing transcoder and rate adaption processing on the telecommunications data with signal processing circuitry if the telecommunications data is speech/voice data comprises:

setting the mode of a signal processing module that is configured to operate in a transcoder and rate adaption mode and an interworking function mode to the transcoder and rate adaption mode; and transferring the telecommunications data to the digital signal processing module.

18. The method of claim 12 wherein performing interworking function processing on the telecommunications data with signal processing circuitry if the telecommunications data is data/fax data comprises:

setting the mode of a signal processing module that is configured to operate in a transcoder and rate adaption mode and an interworking function mode to the interworking function mode; and transferring the telecommunications data to the digital signal processing module.

19. The method of claim 12 wherein performing interworking function processing on the telecommunications data with signal processing circuitry if the telecommunications data is data/fax data comprises:

determining whether a signal processing module is available that is configured to operate in a transcoder and rate adaption mode and an interworking function mode; and transferring the telecommunications data to the signal processing module if it is available.

20. The method of claim 19 further comprising generating a message indicative of non-availability of system components if the signal processing module is not available.

21. The method of claim 12 wherein performing interworking function processing on the telecommunications data with the signal processing circuitry if the telecommunications data is data/fax data further comprises switching the telecommunications data to predetermined digital signal processing circuitry if the telecommunications data is data/fax data.

22. The method of claim 12 wherein performing interworking function processing on the telecommunications data with the signal processing circuitry if the telecommunications data is data/fax data further comprises:

determining whether one or more channels of speech/voice data are associated with the data/fax data; and transferring the one or more associated channels of speech/voice data to be processed by the data processing system that is processing the data/fax data.

23. The system of claim 1 wherein the switch is further operable to switch associated voice channels during switching from the first data processing system to the second data processing system during a GSM handover procedure.

* * * * *